United States Patent
Jeong

(10) Patent No.: US 9,676,269 B2
(45) Date of Patent: Jun. 13, 2017

(54) EXTERNAL ACTIVE AIR FLAP APPARATUS OF VEHICLE

(71) Applicant: Hyundai Motor Company, Seoul (KR)

(72) Inventor: Ji Min Jeong, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/943,137

(22) Filed: Nov. 17, 2015

(65) Prior Publication Data
US 2017/0072783 A1 Mar. 16, 2017

(30) Foreign Application Priority Data
Sep. 11, 2015 (KR) .................. 10-2015-0129043

(51) Int. Cl.
*B60K 11/04* (2006.01)
*B60K 11/08* (2006.01)
*B62D 35/00* (2006.01)

(52) U.S. Cl.
CPC ............ *B60K 11/04* (2013.01); *B60K 11/085* (2013.01); *B62D 35/00* (2013.01)

(58) Field of Classification Search
CPC ........ B60K 11/085; B60K 11/04; B60K 11/08
See application file for complete search history.

(56) References Cited

U.S. PATENT DOCUMENTS

| 8,161,919 B2* | 4/2012 | Klotz | B60K 11/085 123/41.04 |
| 8,398,131 B2* | 3/2013 | Boutaris | B60K 11/085 123/41.04 |
| 8,505,660 B2* | 8/2013 | Fenchak | B60K 11/085 180/68.1 |
| 8,915,320 B2* | 12/2014 | Chinta | B60K 11/08 180/68.1 |
| 8,919,470 B2* | 12/2014 | Hori | B60K 11/085 180/68.1 |
| 9,168,828 B2* | 10/2015 | Bourqui | B60K 11/085 |
| 2010/0139583 A1* | 6/2010 | Klotz | B60K 11/085 123/41.04 |
| 2010/0243352 A1* | 9/2010 | Watanabe | B60K 11/085 180/68.1 |

(Continued)

FOREIGN PATENT DOCUMENTS

| JP | 2007-001503 A | 1/2007 |
| JP | 2010-167942 A | 8/2010 |
| JP | 2014-189245 A | 10/2014 |

(Continued)

*Primary Examiner* — Hau Phan
(74) *Attorney, Agent, or Firm* — Mintz Levin Cohn Ferris Glovsky and Popeo, P.C.; Peter F. Corless

(57) ABSTRACT

An external active air flap apparatus of a vehicle is provided The external active air flap apparatus removes the gap between the air flaps disposed vertically after sealing an air passage of a radiator grill by the air flaps and minimizes the gap between the air flaps and the radiator grill, thereby improving aerodynamic performance of the vehicle. The external active air flap apparatus includes an air flap positioned at a rear of a radiator grill that rotates to open and close an air passage of the radiator grill. Further, a flap fixing mechanism is mounted on the radiator grill and the air flap contracts the air flap with the radiator grill by applying a wind pressure to the air flap operated to seal the air passage.

10 Claims, 7 Drawing Sheets

(56) References Cited

U.S. PATENT DOCUMENTS

2013/0223980 A1* 8/2013 Pastrick .................. F01D 5/00
415/1

FOREIGN PATENT DOCUMENTS

| | | |
|---|---|---|
| JP | 2014-198245 A | 10/2014 |
| KR | 10-1997-0065061 | 10/1997 |
| KR | 10-1998-0029206 | 7/1998 |
| KR | 10-2005-0068076 | 7/2005 |
| KR | 10-2012-0113956 | 10/2012 |
| KR | 10-2014-0032620 | 3/2014 |
| WO | 2011/008253 A1 | 1/2011 |

* cited by examiner

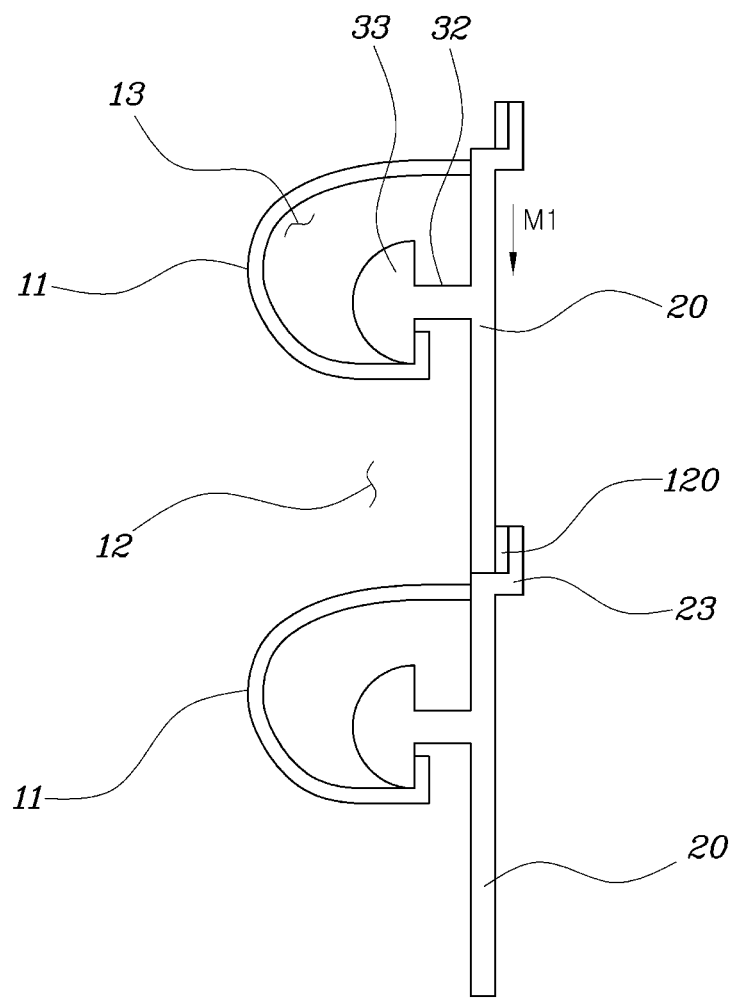

EXTERNAL ACTIVE AIR FLAP APPARATUS OF VEHICLE

CROSS REFERENCE TO RELATED APPLICATION

The present application claims priority to Korean Patent Application No. 10-2015-0129043, filed on Sep. 11, 2015, the entire contents of which is incorporated herein for all purposes by this reference.

BACKGROUND

1. Technical Field

The present invention relates to an external active air flap apparatus of a vehicle, and more particularly, to a technology of an external active air flap apparatus of a vehicle that improves aerodynamic performance by improving a seal with a radiator grill.

2. Description of the Related Art

Generally, an engine compartment of a vehicle includes with various heat exchangers such as a radiator, an intercooler, an evaporator, and a condenser as well as driving components such as an engine. A heat exchange medium is mainly distributed within the heat exchangers. For example, a heat exchange medium disposed within the heat exchanger exchanges heat with external air to perform cooling or heat radiation. Additionally, the external air should be smoothly supplied into the engine compartment to stably operate various heat exchangers within a vehicle engine compartment. However, when a vehicle speed increases, a substantial amount of external air is rapidly introduced and air resistance increases, causing fuel efficiency of a vehicle to decrease.

Recently, an active air flap apparatus capable of improving the fuel efficiency of a vehicle has been developed. For example, increasing an opening angle when the vehicle is driven at a low speed increases an introduced amount of air into the engine compartment and reducing an opening angle when the vehicle is driven at a low speed reduces the amount of external air introduced amount of air into the engine compartment. The active air flap apparatus is classified into and embedded type and an external type.

The embedded type is a Shroud duct type and has a structure that includes a duct for guiding a flow of introduced air mounted on a rear of the radiator grill. Further, a plurality of air flaps open and close air passages of the duct rotatably coupled to the duct, and a driver coupled to the air flaps is mounted on a rear of the duct. The driver may include an actuator fixedly mounted on the duct and a loader, a link connecting the actuator to the air flap, and the like. The embedded active air flap apparatus mounts the driver on a layout since the driver for adjusting the air flap is mounted on the duct. However, the aerodynamic performance is reduced and costs and a weight are increased due to the use of the duct, compared to that of the external type.

The external type is a radiator grill integrated type and has a structure that includes the to plurality of air flaps rotatably mounted within the air passage of the radiator grill to open and close the air passage of the grill. The driver connects the air flaps mounted on the rear of the grill. The external type active air flap apparatus does not use the duct used in the embedded type. Accordingly, the improvement effect of the aerodynamic performance increases and the costs and weight compared to the embedded type decrease. However the air flaps are spaced apart from the radiator grill by a wind pressure since the air flaps are sealed to have a linear contact with a rear end of the radiator grill in the operating state to reduce the sealability between the air flaps and the radiator grill. Additionally, the aerodynamic performance of the vehicle may not be significantly improved to a desired level.

The above information disclosed in this section are intendent merely for assisting in the understanding for the background of the present invention and therefore may contain information that does not form the prior art that is known to those skilled in the art.

SUMMARY

The present invention provides an external active air flap apparatus capable of preventing the air flaps from being separated from a radiator grill by a wind pressure in an operating state to improve a seal between the air flaps and the radiator grill and improve aerodynamic performance of the vehicle.

In one aspect, according to an exemplary embodiment, an external active air flap apparatus, may include an air flap disposed at a rear of a radiator grill and may be configured to rotate to open and close an air passage of the radiator grill; and a flap fixing mechanism mounted on the radiator grill and the air flap. The air flap may contact the radiator grill when a wind pressure forces the air flap to seal the air passage to improve a seal between the air flap and the radiator grill.

The external active air flap apparatus may further include a first actuator that may be connected to a rotating shaft of the air flap to supply power to rotate the air flap and a flap transition mechanism disposed to connect the first actuator and vertically translocates the air flap. The first actuator and a second actuator may connect the flap transition mechanism to supply power to actuate the flap transition mechanism.

The flap fixing mechanism may include a grill protrusion component that protrudes upward from a rear end of the radiator grill toward an interior space of the radiator grill and a flap protrusion component and a protrusion head component disposed on one surface of the air flap to protrude forward when the air flap seals the air passage. Further the protrusion head component may be inserted into the interior space of the radiator grill and then may be locked (e.g., fixedly coupled) to the grill protrusion component.

In some exemplary embodiments, rotating shaft of a first side of the air flap may be directly connected to the first actuator and a rotating shaft of a second side thereof may be rotatably coupled with a connection mechanism. The connection mechanism may be fixedly mounted on a front bumper. The flap transition mechanism may include a transition rod movably mounted vertically while being positioned at one side (e.g., a first side) of the air flap. The flap may be fixed with the first actuator and may have a rack gear mounted on one surface thereof disposed along a vertical length direction; and a pinion gear meshed with the rack gear and directly connected to the second actuator. The first actuator and the second actuator may be a motor and the second actuator may be fixedly mounted on the body of the vehicle. Operation of the first actuator and the second actuator may be configured to be performed by a controller that receives a signal from a vehicle speed sensor.

A plurality of air flaps may be vertically spaced apart (e.g., separated) from each other. In particular, any one of the plurality of air flaps may be connected to the first actuator and the other air flaps may include rotating shafts disposed on one side (e.g., first side) rotatably mounted on a transition rod and rotating shafts disposed on the other side (e.g., second side) rotatably mounted on the connection mechanism. The plurality of air flaps may be coupled to each other by a connection link to substantially simultaneously rotate by the first actuator. When the plurality of air flaps are operated to seal the air passage, rear portions of each air flap may be provided with an L-shaped overlapping component to remove a gap between the air flaps. One surface of the overlapping component may be coupled with a pad member to improve the seal between the air flaps.

BRIEF DESCRIPTION OF THE DRAWINGS

The above and other objects, features and other advantages of the present disclosure will be more clearly understood from the following detailed description when taken in conjunction with the accompanying drawings:

FIGS. 6 and 7 are exemplary diagrams illustrating an operation of sealing an air passage of a radiator grill by transition of the rotating air flaps downward accordingly to an exemplary embodiment of the present invention.

DESCRIPTION OF THE EXEMPLARY EMBODIMENTS

Figure 1:
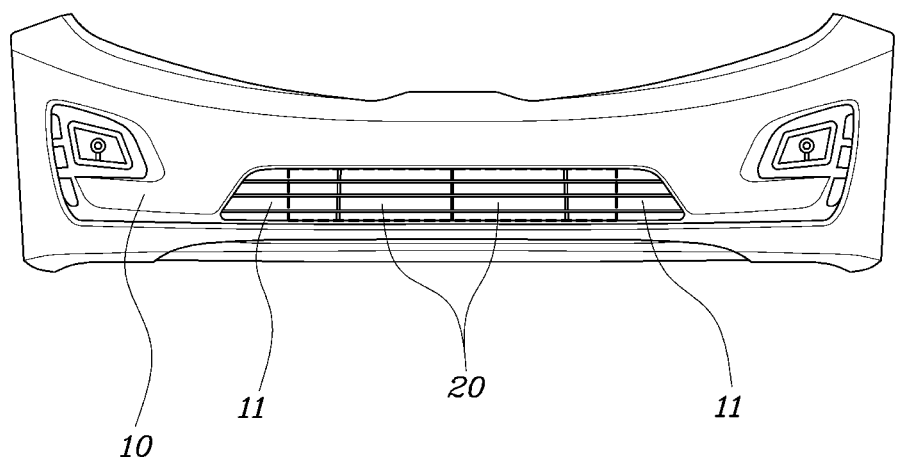
FIG. 1 is an exemplary front view of a front bumper in which an external active air flap apparatus according to an exemplary embodiment of the present invention is mounted.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

As illustrated in FIGS. 1 to 7, an external active air flap apparatus according to an exemplary embodiment may include an air flap 20 positioned at a rear of a radiator grill 11 mounted on a front bumper 10 and may be configured to rotate to open and close an air passage 12 of the radiator grill 11 and a flap fixing mechanism 30 mounted on the radiator grill 11 and the air flap 20 and contacts the air flap 20 with the radiator grill 11 when a wind pressure applied to the air flap 20 seals the air passage 12 to improve a seal between the air flap 20 and the radiator grill 11.

Further, the external active air flap apparatus according to the exemplary embodiment may include a first actuator 40 connected (e.g., directly) to a rotating shaft 21 disposed on one side of the air flap 20 and may be configured to supply power to rotate the air flap 20. A flap transition mechanism 50 that may be disposed to connect the first actuator 40 and vertically translocating the air flap 20, including the first actuator 40; and a second actuator 60 connected to the flap transition mechanism 50 to supply power to adjust the flap transition mechanism 50.

Figure 3:
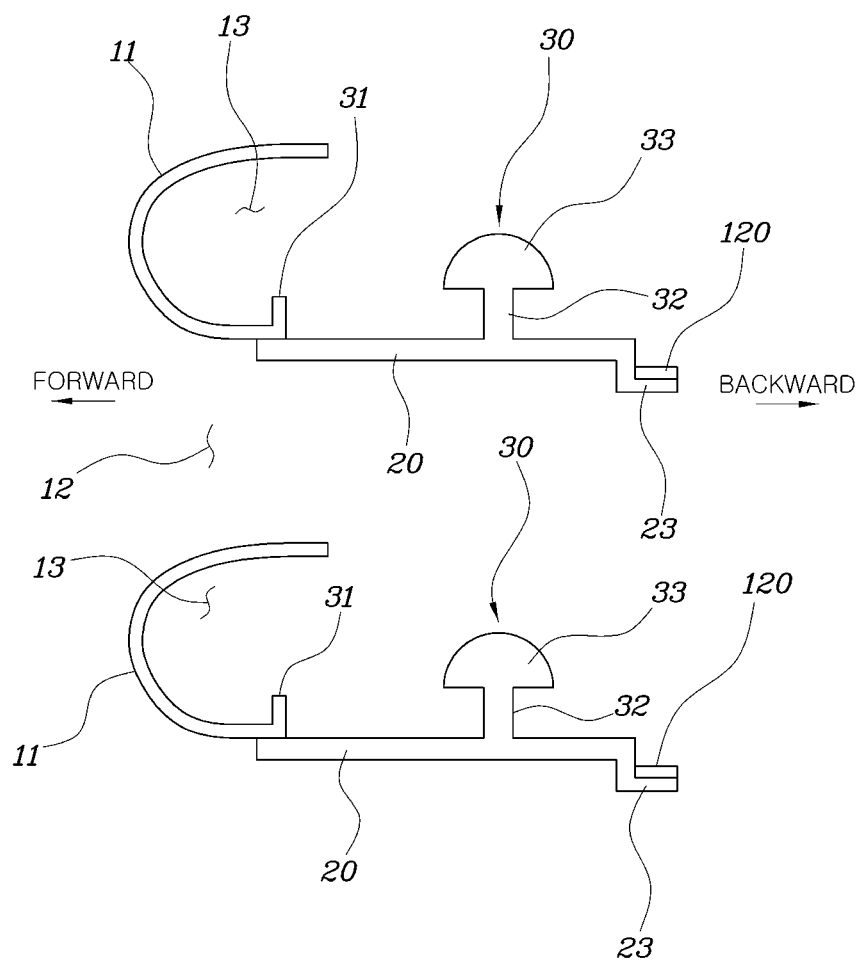
FIG. 3 is an exemplary side view schematically illustrating as shown in FIG. 2 according to the exemplary embodiment of the present invention.
Figure 5:
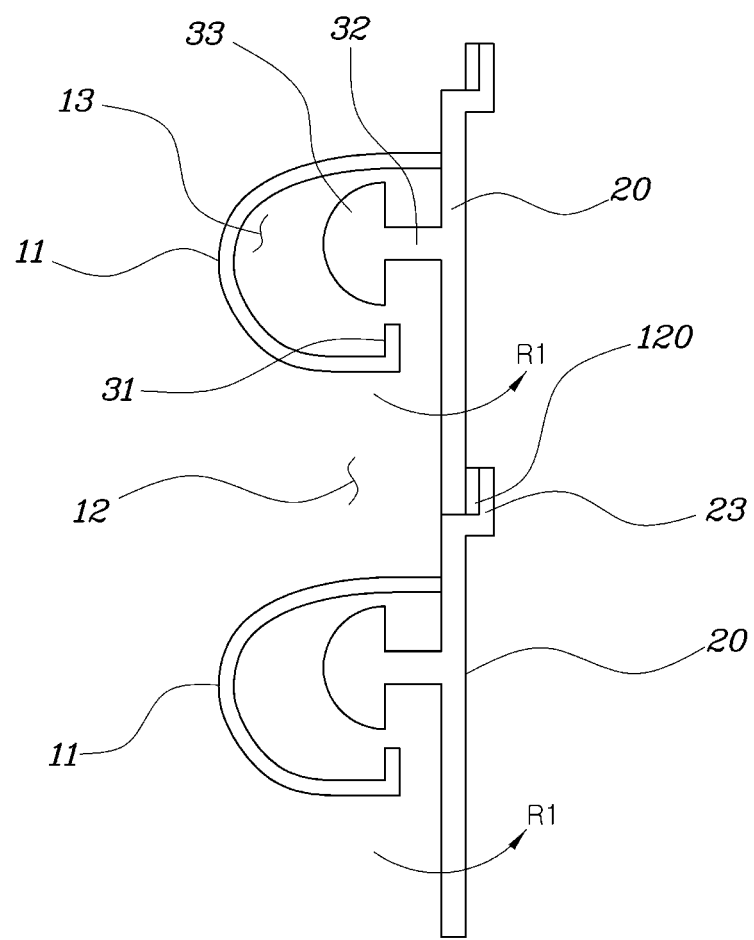

The flap fixing mechanism 30 may include a grill protrusion component 31 that protrudes upward from a rear portion of the radiator grill 11 toward an interior space 13 of the radiator grill 11. A flap protrusion component 32 and a protrusion head component 33 may be mounted on one surface of the air flap 20 to protrude forward when the air flap 20 may operate to seal the air passage 12. When the air flap 20 rotates by power of the first actuator 40 prior to the operation as illustrated in FIG. 3, for example, as illustrated in FIG. 5, the protrusion head component 33 may be inserted into the interior space 13 of the radiator grill 11. When the flap transition mechanism 50 adjusts downward by the power of the second actuator 60 as shown in FIG. 5, and as illustrated in FIG. 7, the protrusion head component 33 may be positioned in front of the grill protrusion component 31. In other words a back surface of the protrusion head component 33 contacts a front surface of the grill protrusion component 31 by wind power applied to the air flap 20 to be locked and prevents the air flap 20 separation from the radiator grill 11, thereby to improve a seal between the air flap 20 and the radiator grill 11.

According to the exemplary embodiment, the rotating shaft 21 of one side (e.g., a first side) of the air flap 20 may be directly connected to the first actuator 40 and the rotating shaft 22 of the other side (e.g., a second side) may be rotatably coupled with a connection mechanism 70. Further, the connection mechanism 70 may have a structure that fixedly mounted on the front bumper 10. Additionally, the connection mechanism 70 may be fixedly mounted on a back beam.

The flap transition mechanism 50 may include a transition rod 51 movably mounted vertically while positioned at one side of the air flap 20. The transition mechanism 50 may be fixed with the first actuator 40 and may have a rack gear 51a mounted on one surface thereof along a vertical length direction; and a pinion gear 52 meshed with the rack gear 51a and directly connected to the second actuator 60. For example, the first and second actuators 40 and 60, a motor, a cylinder that operates by an oil pressure or an air pressure, or a solenoid may be used and other apparatuses generating power may also be used. The second actuator 60 may be fixedly mounted on a vehicle body 80 or fixedly mounted on the back beam.

Figure 2:
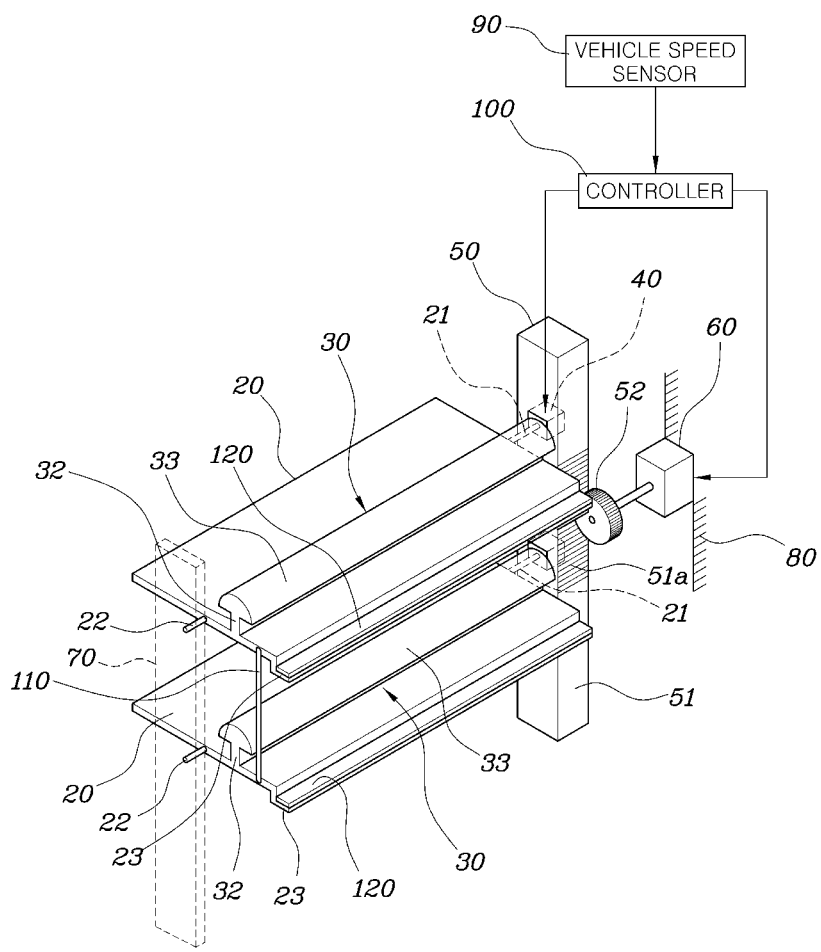
FIG. 2 is an exemplary view of the external active air flap apparatus according to the exemplary embodiment of the present invention and illustrates a state before engagement of operation.
Figure 6:
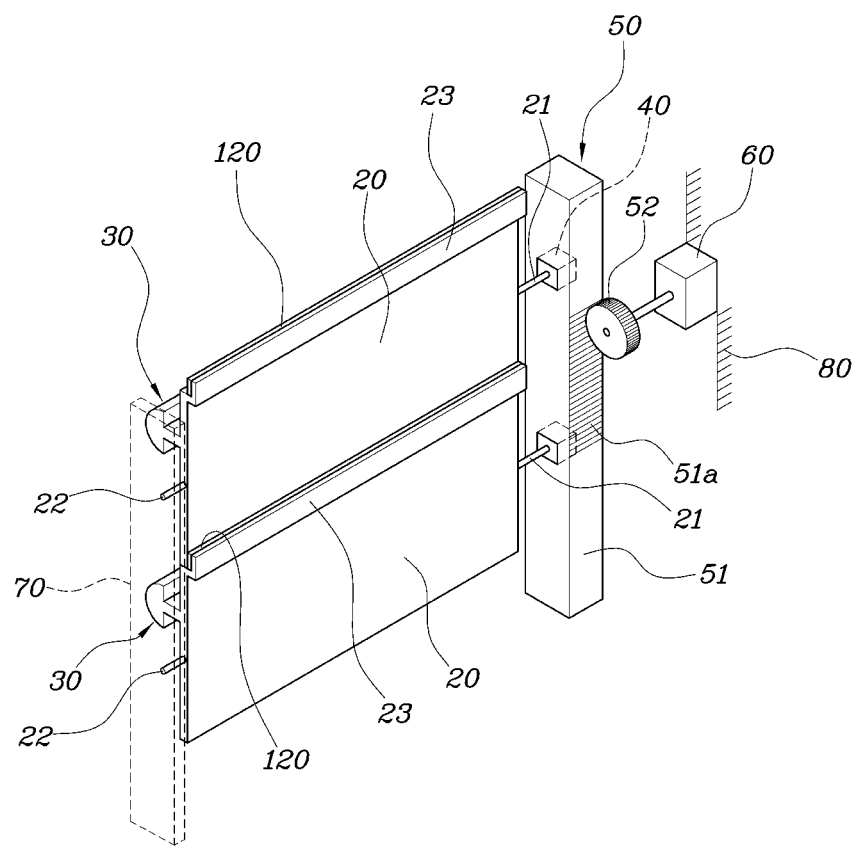

The operations of the first actuator 40 and the second actuator 60 may be performed be by a controller 100 that may be configured to receives a signal of a vehicle speed sensor 90. As illustrated in FIGS. 2 and 3, when the vehicle is driven at a substantially low speed driving, the first and second actuators 40 and 60 may operate the air flap 20 to open the air passage 12 of the radiator grill 11 and as illustrated in FIGS. 6 and 7. When the vehicle operates at a sustainably high speed driving, the first and second actuators 40 and 60 may be operated so that the air flap 20 seals the air passage 12 of the radiator grill 11.

Moreover, according to the exemplary embodiment, the air flap 20 may include plural to be vertically spaced apart (e.g., separated) from each other. Additionally, one of the plurality of air flaps 20 may be directly connected to the first actuator 40 and the remaining air flaps 29 may have the rotating shafts 21 of one side rotatably mounted on the transition rod 51 and the rotating shafts 21 of the other side may be rotatably mounted on the connection mechanism 70.

The plurality of air flaps 20 may be connected to each other via a connection link 110 to be simultaneously rotated by the first actuator 40 and both portions of the connection link 110 may be coupled together via a hinge structure (but not limited thereto) that rotates with respect to the air flap 20. When the plurality of air flaps 20 operate to seal the air passage 12, the rear portions of each air flap 200 may include L-shaped overlapping components 23 to remove a gap between the air flaps 20. Further, one surface of the overlapping component 23 may be coupled with a pad member 120 to improve a seal between the air flaps 20. The pad member 120 may be a rubber pad but plastic resin or silicon material or the like may also be used provided the material improves the seal.

Figure 4:
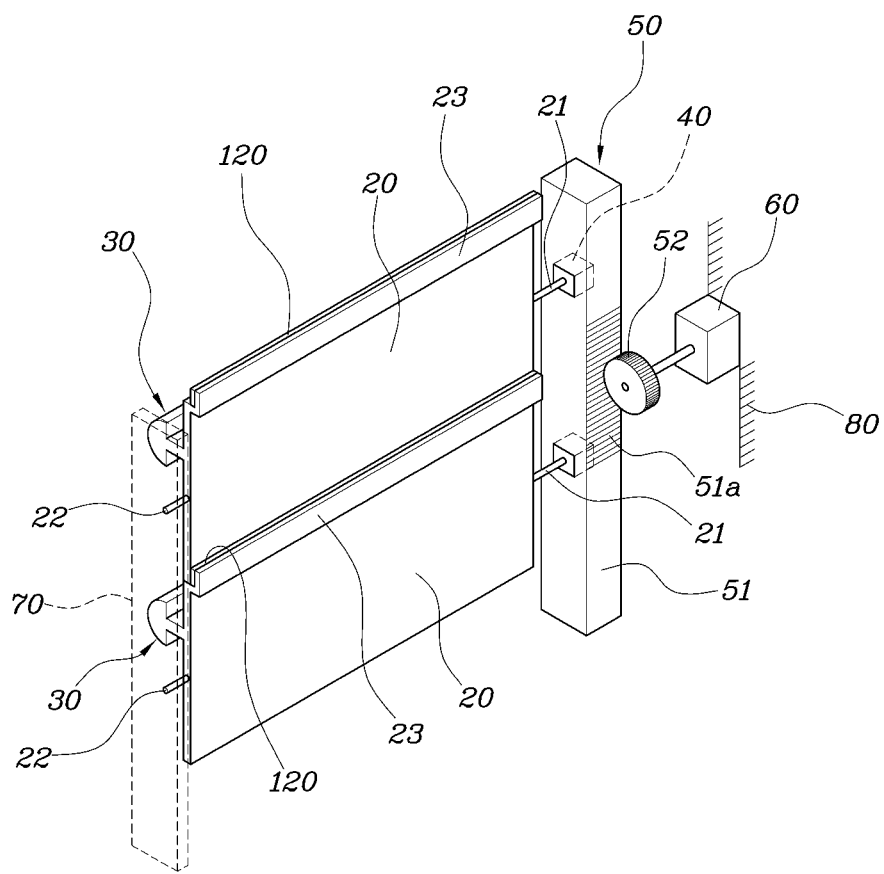
FIGS. 4 and 5 are exemplary diagrams illustrating the rotation of the air flap according to an exemplary embodiment of the present invention.

Hereinafter, an operation of the exemplary embodiment of the present invention will be described. FIGS. 2 and 3 illustrate the vehicle in a static or stopped mode of operation or when the vehicle operates at a low speed. In particular, the air flap 20 may maintain an initial position prior to operation disposed horizontally and the air passage 12 of the radiator grill 11 may maintain an opened state. When the vehicle speed adjusts to a high speed driving speed as shown in FIGS. 2 and 3, the first actuator 40 operates via the controller 100 and the air flap 20 rotates (arrow R1) based on the rotating shafts 21 and 22. As illustrated in FIGS. 4 and 5 the operation of the first actuator 40 may be adjusted to a vertical state.

As described above, when the air flap 20 maintains a vertical position, the protrusion head component 33 may be inserted into the interior space 13 of the radiator grill 11. The overlapping component 23 of the air flap 20 positioned at a lower portion surface contacts an end of the air flap 20 positioned at an upper portion so that the air flaps 20 vertically disposed may overlap with each other. Additionally the gap between the air flaps 20 and the pad member 120 mounted on the overlapping component 23 further surface-contacts the end of the air flap 20 positioned at the upper portion, thereby improving the seal between the air flaps 20.

As illustrated in FIGS. 4 and 5, after the overlapping parts 23 overlap with each other by vertically mounting the upper and lower air flaps 20, the second actuator 60 may be configured to be operated by the controller 100 and a pinion gear 52 may rotate by the operation of the second actuator 60 and the transition rod 51 may be displaced downward (arrow M1) by the rotation of the pinion gear 62 as illustrated in FIGS. 6 and 7.

As described above, when the air passage 12 of the radiator grill 11 seals the air flap 20, the protrusion head component 33 may be positioned in front of the grill protrusion component 31. In other words, the back surface of the protrusion head component 33 contacts the front surface of the grill protrusion component 31 by the wind power applied to the air flap 20 to be locked, and may prevent the air flap 20 separation from the radiator grill 11 by the wind pressure. Accordingly, the seal between the air flap 20 and the radiator grill 11 may be improved, thereby improving the sealing of the air passage 12 of the radiator grill 11 by the air flap 20 to improve the aerodynamic performance of the vehicle.

As illustrated in FIGS. 6 and 7, when the driving speed of the vehicle adjusts to the low speed, the components may be operated by the controller 100 for example, the flap transition mechanism 50 and the air flap 20 may be operated reversely to the foregoing direction by the first and second actuators 40 and 60. For example, the air flap 20 may return to an initial state as illustrated in FIGS. 2 and 3 and may be in a preparation state for the next operation. As described above, the external active air flap apparatus according to the exemplary embodiment does not require the duct to improve the aerodynamic performance, compare to the embedded active air flap apparatus.

Further, the gap between the air flaps 20 vertically disposed may be removed and the gap between the air flap 20 and the radiator grill 11 may be minimized after the sealing of the air passage 12 of the radiator grill 11 by the air flap 20. Therefore, the seal of the air passage 12 of the radiator grill 11 by the air flap 20 may be improved, thereby improving the aerodynamic performance of the vehicle.

The external active air flap apparatus according to the exemplary embodiments may require the duct unlike the embedded active air flap apparatus to improve the aerodynamic performance. The gap between the air flaps vertically disposed after sealing the air passage of the radiator grill by the air flaps may be removed, and may minimize the gap between air flaps and the radiator grill. Additionally the seal of the air passage of the radiator grill may be improved by the air flap, thereby improving the aerodynamic performance of the vehicle.

While this invention has been described in connection with what is presently considered to be exemplary embodiments on the contrary, it is intended to cover various modifications and equivalent arrangements without departing from the spirit and scope of the present invention as defined by the following claims. In addition, it is to be considered that all of these modifications and alterations fall within the scope of the present invention

What is claimed is:

1. An external active air flap apparatus, comprising:
   an air flap positioned at a rear of a radiator grill and configured to rotate to open and close an air passage of the radiator grill; and
   a flap fixing mechanism mounted on the radiator grill and the air flap and contacting the air flap with the radiator grill by a wind pressure applied to the air flap in order to increase a seal between the air flap and the radiator grill,
   wherein the flap fixing mechanism includes:
   a grill protrusion component that protrudes upward from a rear end of the radiator grill toward an interior space of the radiator grill; and
   a flap protrusion component and a protrusion head component mounted on one surface of the air flap to protrude forward when the air flap is operated to seal the air passage, wherein
   the protrusion head component is inserted into the interior space of the radiator grill and is locked to the grill protrusion component to be fixed.

2. The external active air flap apparatus of claim 1, further comprising:
   a first actuator coupled to a rotating shaft of the air flap to supply power to rotate the air flap;
   a flap transition mechanism coupled to the first actuator that vertically translocates the air flap, including the first actuator; and
   a second actuator coupled to the flap transition mechanism to supply power to move the flap transition mechanism.

3. The external active air flap apparatus of claim 2, wherein a rotating shaft of a first side of the air flap is coupled to the first actuator and a rotating shaft of a second side thereof is rotatably coupled with a connection mechanism, and
   the connection mechanism is fixedly mounted on a front bumper.

4. The external active air flap apparatus of claim 2, wherein the flap transition mechanism includes:
   a transition rod movably mounted vertically while being positioned at one side of the air flap and fixed with the first actuator and having a rack gear mounted on one surface thereof along a vertical length direction; and
   a pinion gear meshed with the rack gear and directly connected to the second actuator.

5. The external active air flap apparatus of claim 4, wherein a plurality of air flaps are vertically spaced apart from each other, and any one of the plurality of air flaps is directly connected to the first actuator and the remaining air flaps have rotating shafts of the first side rotatably mounted on a transition rod and rotating shafts of the second side rotatably mounted on the connection mechanism.

6. The external active air flap apparatus of claim 5, wherein the plurality of air flaps are connected to each other by a connection link to simultaneously rotate by the first actuator.

7. The external active air flap apparatus of claim 5, wherein when the plurality of air flaps are operated to seal the air passage, rear portions of each air flap are provided with an L-shaped overlapping component to remove a gap between the air flaps.

8. The external active air flap apparatus of claim 7, wherein a surface of the overlapping component is coupled with a pad member to increases a seal between the air flaps.

9. The external active air flap apparatus of claim 2, wherein the first actuator and the second actuator are a motor, and the second actuator is fixedly mounted on the vehicle body.

10. The external active air flap apparatus of claim 2, wherein the first actuator and the second actuator are operated by a controller receiving a signal from a vehicle speed sensor.

* * * * *